(12) United States Patent
Liu

(10) Patent No.: US 11,755,871 B2
(45) Date of Patent: Sep. 12, 2023

(54) TRANSACTION CARD WITH LUMINOUS DISPLAY

(71) Applicant: Lien Hao Chuang, Kaohsiung (TW)

(72) Inventor: Jen-Hsiang Liu, Taoyuan (TW)

(73) Assignee: Lien Hao Chuang, Kaohsiung (TW)

( * ) Notice: Subject to any disclaimer, the term of this patent is extended or adjusted under 35 U.S.C. 154(b) by 0 days.

(21) Appl. No.: 17/846,047

(22) Filed: Jun. 22, 2022

(65) Prior Publication Data

US 2023/0177302 A1    Jun. 8, 2023

(30) Foreign Application Priority Data

Dec. 7, 2021   (TW) ................................ 110145694

(51) Int. Cl.
*G06K 19/077* (2006.01)
*G06K 19/07* (2006.01)

(52) U.S. Cl.
CPC ... *G06K 19/07707* (2013.01); *G06K 19/0723* (2013.01)

(58) Field of Classification Search
CPC ......... G06K 19/07707; G06K 19/0723; G06K 19/07; G06K 19/077; G06K 19/07705; G06K 19/07703; G06K 19/07749
See application file for complete search history.

(56) References Cited

U.S. PATENT DOCUMENTS

| | | | |
|---|---|---|---|
| 2004/0078661 A1* | 4/2004 | Nakano | G06K 19/0723 714/24 |
| 2009/0109701 A1* | 4/2009 | Hsieh | B42D 15/02 362/604 |
| 2012/0061476 A1* | 3/2012 | Le Garrec | G06K 19/07779 235/492 |

FOREIGN PATENT DOCUMENTS

| | | | |
|---|---|---|---|
| CN | 211591948 U | * | 9/2020 |
| JP | 2001266104 A | * | 9/2001 |

* cited by examiner

*Primary Examiner* — Sonji N Johnson

(57) ABSTRACT

A transaction card with a luminous display includes a card body, an electronic control module, a light emitting module and a light guide module. The card body is provided with a light-transparent frame part around; the electronic control module is provided in the card body; the light emitting module is provided in the card body and electrically connected to the electronic control module; the light guide module is provided in the card body and corresponds to the light emitting module, the light guide module guides a light source of the light emitting module to the light-transparent frame part of the card body.

7 Claims, 5 Drawing Sheets

TRANSACTION CARD WITH LUMINOUS DISPLAY

CROSS-REFERENCE TO RELATED APPLICATION

This non-provisional application claims priority under 35 U.S.C. § 119(a) on Patent Application No(s). 110145694 filed in Taiwan, R.O.C. on Dec. 7, 2021, the entire contents of which are hereby incorporated by reference.

BACKGROUND OF THE INVENTION

1. Field of the Invention

The present disclosure provides a transaction card, and in particular to a transaction card with a luminous display.

2. Description of the Related Art

General traditional portable cards, such as: bank cards, credit cards, deposit cards, easy cards, health insurance cards or citizen digital certificates, which are divided into a contact type or non-contact type according to the method of use, the contact type is that the chip is exposed on the surface of the card to electrically contact with an external card reader, so that the card reader reads the required information in the chip for transaction; and the non-contact type is that an induction coil and an RFID tag thereof are embedded in the card, when the card is close to a reading module, an antenna of the reading module and the induction coil of the card are mutually induced to produce power, in order to provide the information of the RFID tag read by the reading module for the required transaction.

However, in the case of the traditional contact type card or the non-contact type card, since the card itself fails to have any mechanism to prompt a consumer, when the transaction is carried out, the consumer can usually only be informed from the store whether the card has completed the transaction, and cannot judge whether the card is in the transaction state by himself, resulting in the personal information in the RFID tag of the card being appropriated by the unscrupulous store with the relevant machine after the transaction or during the transaction.

Thus, it is desirable to create a transaction card with a luminous display, when a card body is used to carry out transactions, in addition to achieving the effect of the transaction prompt, it also has an aesthetic visual effect, thereby effectively improving the shortcoming of prior art that are to be actively disclosed by the disclosure.

BRIEF SUMMARY OF THE INVENTION

In view of the shortcomings of the above-mentioned prior art, the inventor felt that it was not perfect, and exhausted his mind to research carefully into a way for overcoming the problems, and then developed a transaction card with a luminous display, with a view to achieving the purpose of not only having the effect of transaction prompts, but also having an aesthetic visual effect at transaction.

To achieve the above objective and other objectives, the present disclosure provides a transaction card with a luminous display, comprising: a card body, an electronic control module, a light emitting module and a light guide module. The card body is provided with a light-transparent frame part around; the electronic control module is provided in the card body; the light emitting module is provided in the card body and electrically connected to the electronic control module; the light guide module is provided in the card body and corresponds to the light emitting module, the light guide module guides a light source of the light emitting module to the light-transparent frame part of the card body.

In the above-mentioned transaction card with a luminous display, the card body comprises a first light-transparent panel, a first shading part, a second light-transparent panel and a second shading part, the first light-transparent panel is combined with the second light-transparent panel, the first shading part is disposed on the first light-transparent panel, the second shading part is disposed on the second light-transparent panel, and the electronic control module, the light emitting module and the light guide module are provided between the first light-transparent panel and the second light-transparent panel.

In the above-mentioned transaction card with a luminous display, the first shading part is smaller than the first light-transparent panel, the second shading part is smaller than the second light-transparent panel, so that the card body forms the light-transparent frame part around.

In the above-mentioned transaction card with a luminous display, the light guide module is located between the first shading part and the second shading part, and the light guide module is a transparent PVC, PET, PC or PMMA material.

In the above-mentioned transaction card with a luminous display, the first light-transparent panel and the second light-transparent panel are combined by a light-transparent combination part, and the light-transparent combination part corresponds to the light-transparent frame part and connects to a circumference of the light guide module.

In the above-mentioned transaction card with a luminous display, the electronic control module includes a circuit control carrier board, a non-contact radio frequency antenna and a contact communication chip, the light emitting module and the contact communication chip are disposed on the circuit control carrier board, and the non-contact radio frequency antenna is disposed in the circuit control carrier board.

In the above-mentioned transaction card with a luminous display, the light emitting module has a light emitter, the light guide module has a perforation for accommodating the light emitter.

In the above-mentioned transaction card with a luminous display, the light emitting module has a plurality of light emitters, the light guide module has a plurality of perforations, each the perforation accommodates each the light emitter.

In the above-mentioned transaction card with a luminous display, the card body further comprises a surface light-transparent part, the light guide module has at least one refractive part, the refractive part corresponds to the surface light-transparent part, the light guide module goes with the refraction part to guide the light source of the light emitting module to the surface light-transparent part.

Accordingly, as to the transaction card with a luminous display of the present disclosure, when the card body is used to carry out transactions, the light emitting module is driven by the electronic control module, and the light source of the light emitting module is guided to the light-transparent frame part by the light guide module, so that the card body displays the transaction information, in addition to achieving the effect of the transaction prompt, it also has an aesthetic visual effect.

DETAILED DESCRIPTION OF THE INVETION

To facilitate understanding of the above purpose, characteristics and effects of this present disclosure, embodiments together with the attached drawings for the detailed description of the present disclosure are provided as below.

Figure 1:
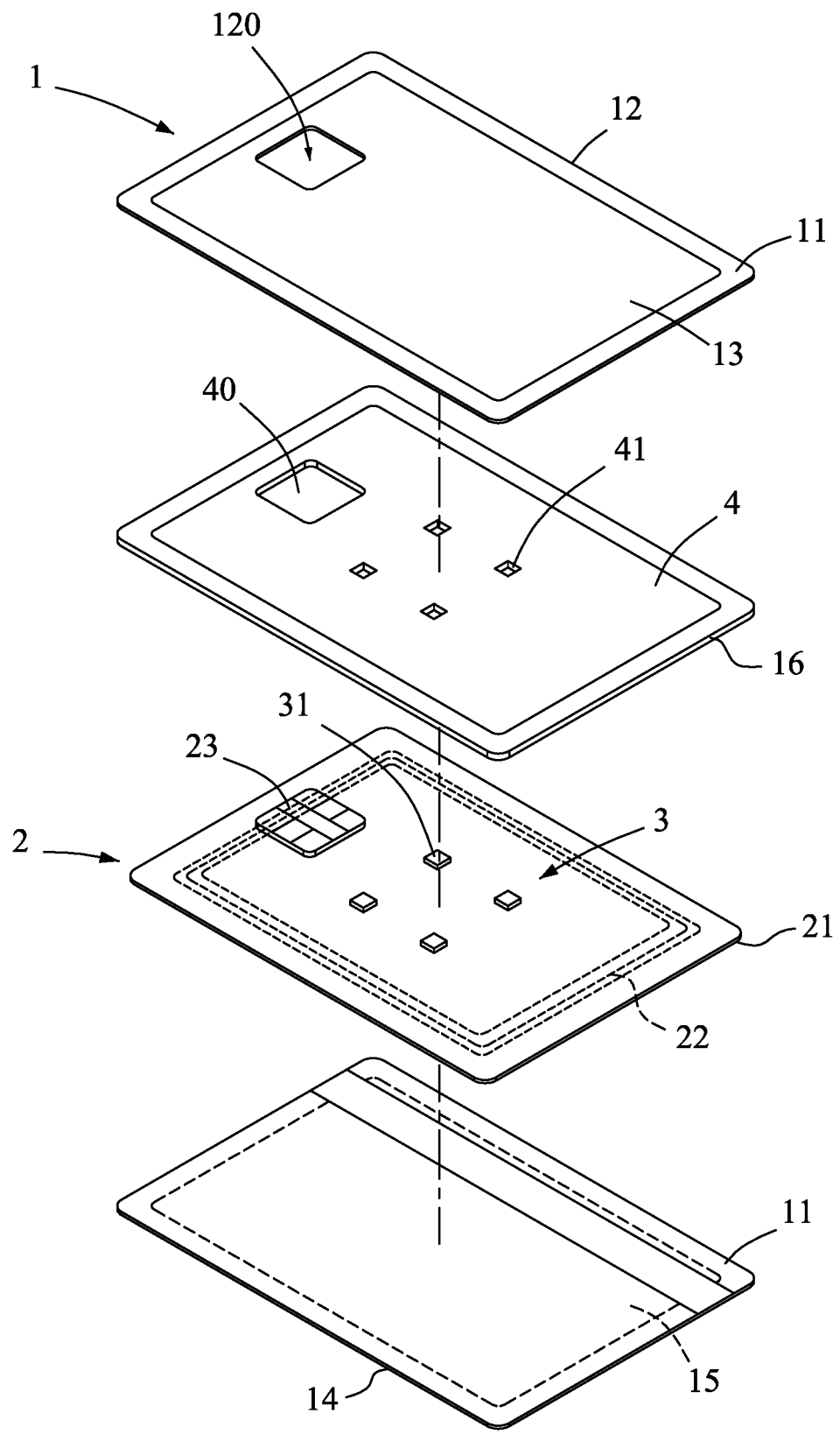
FIG. 1 is a schematic exploded view of a first preferable embodiment of the present disclosure.
Figure 2:
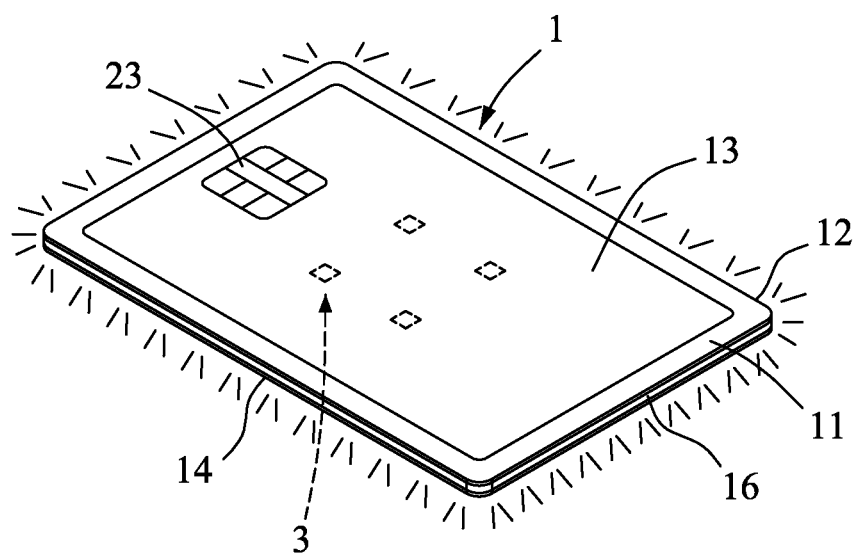
FIG. 2 is a schematic outside view of the first preferable embodiment of the present disclosure.
Figure 3:
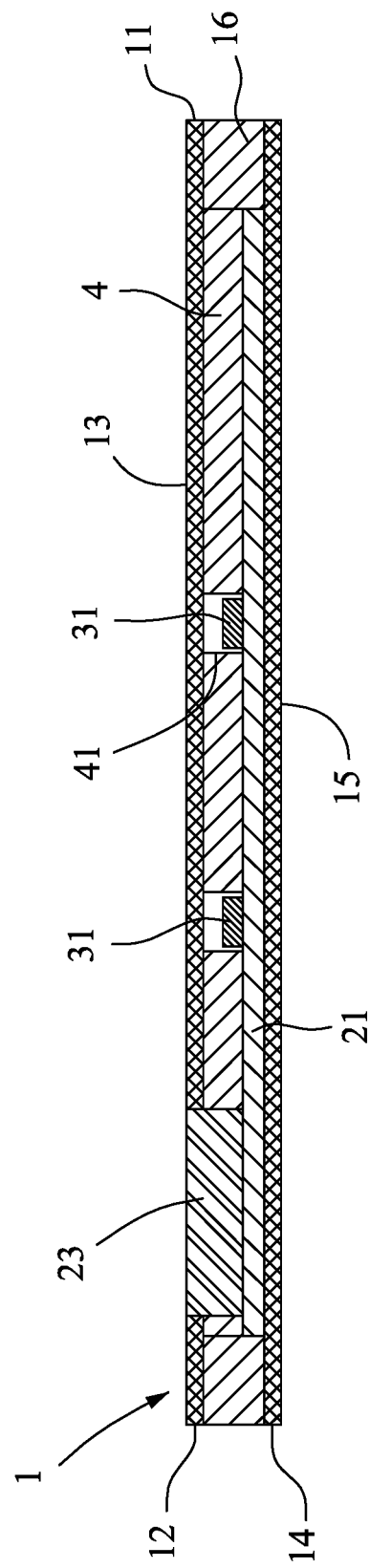
FIG. 3 is a schematic sectional view of the first preferable embodiment of the present disclosure.

Referring to FIGS. 1 to 3, as shown in the drawings, the present disclosure provides a transaction card with a luminous display, which comprises at least one card body 1, an electronic control module 2, a light emitting module 3 and a light guide module 4.

The card body 1 is provided with a light-transparent frame part 11 around.

The electronic control module 2 is provided in the card body 1.

The light emitting module 3 is provided in the card body 1 and electrically connected to the electronic control module 2.

The light guide module 4 may be a light guide plate, and is provided in the card body 1 and corresponds to the light emitting module 3, the light guide module 4 guides a light source of the light emitting module 3 to the light-transparent frame part 11 of the card body 1.

When carrying out transactions with the card body 1, a user may use the card body 1 to be close to a reading module or insert into the reading module (not shown in the drawings), so that the electronic control module 2 obtains the power provided by the reading module, and the electronic control module 2 is started by the power to make the electronic control module 2 exchange personal information and transaction data with the reading module for the use of transactions, and the electronic control module 2 drives the light emitting module 3 to make the light emitting module 3 emit a light source, and the light source of the light emitting module 3 is guided to the light-transparent frame part 11 by the light guide module 4, so that a periphery of the card body 1 emits a displaying light source, thereby informing a consumer that the transaction is being processed, and when the transaction ends and the card body 1 is removed, the electronic control module 2 is unable to read an electromagnetic wave from the reading module and produce a power outage, and then the electronic control module 2 and the light emitting module 3 present off states, so that the light emitting module 3 no longer emits the light source to remind the consumer that the transaction ends and the card is in a state of unuse, in order to prevent the unscrupulous store from continuing to use the card after ending the transaction. Accordingly, when the card body 1 is used to carry out transactions, the light emitting module 3 is driven by the electronic control module 2, and the light source of the light emitting module 3 is guided to the light-transparent frame part 11 by the light guide module 4, so that the card body 1 displays the transaction information, in addition to achieving the effect of the transaction prompt, it also has an aesthetic visual effect.

In one embodiment of the present disclosure, the card body 1 comprises a first light-transparent panel 12, a first shading part 13, a second light-transparent panel 14 and a second shading part 15, the first light-transparent panel 12 is combined with the second light-transparent panel 14, the first shading part 13 is disposed on an outer surface of the first light-transparent panel 12, the second shading part 15 is disposed on an outer surface of the second light-transparent panel 14, and the electronic control module 2, the light emitting module 3 and the light guide module 4 are provided between the first light-transparent panel 12 and the second light-transparent panel 14, wherein the first shading part 13 is smaller than the first light-transparent panel 12, the second shading part 15 is smaller than the second light-transparent panel 14, so that the card body 1 forms the light-transparent frame part 11 around, and the light guide module 4 is located between the first shading part 13 and the second shading part 15, and the light guide module 4 may be a transparent PVC, PET, PC or PMMA material.

Based on the above embodiment, when the light emitting module 3 emits a light source, and the light source is guided to the light-transparent frame part 11 by the light guide module 4, the light source may be shielded by the first shading part 13 and the second shading part 15, so that the light source may be assuredly guided by the light guide module 4 to the light-transparent frame part 11, and the periphery of the card body 1 emits a displaying light source, thereby informing a consumer that the transaction is being processed, in addition to achieving the effect of the transaction prompt, it also has an aesthetic visual effect. In addition, the transparent PVC, PET, PC or PMMA can be selected as a material of the light guide module 4 according to the requirements, so that the light guide module 4 can meet different use needs.

In one embodiment of the present disclosure, the first light-transparent panel 12 and the second light-transparent panel 14 are combined by a light-transparent combination part 16, and the light-transparent combination part 16 corresponds to the light-transparent frame part 11 and connects to a circumference of the light guide module 4 and a circumference of the electronic control module 2. Accordingly, because of the shielding of the first shading part 13 and the second shading part 15, the light source may be assuredly guided by the light guide module 4 to the light-transparent frame part 11 by way of the light-transparent combination part 16, and the periphery of the card body 1 emits a displaying light source, thereby informing a consumer that the transaction is being processed, in addition to achieving the effect of the transaction prompt, it also has an aesthetic visual effect.

Further, the first light-transparent panel 12 and the second light-transparent panel 14 may be transparent ABS, PETG, PVC or PET materials, and the first shading part 13 and the second shading part 15 may be shading ink; accordingly, the first shading part 13 and the second shading part 15 are effectively used for shielding the light, so that the light source may be assuredly guided by the light guide module 4 to the light-transparent frame part 11 by way of the light-transparent combination part 16, and the periphery of the card body 1 emits a displaying light source.

Further, the first shading part 13 and the second shading part 15 may be full-sided opaque shielding layers, or required pattern parts (not shown in the drawings) are superimposed on the surfaces of the first shading part 13 and the second shading part 15, so that the card body 1 can further meet the actual needs.

In one embodiment of the present disclosure, the electronic control module 2 includes a circuit control carrier board 21, a non-contact radio frequency antenna 22 and a contact communication chip 23, the light emitting module 3 and the contact communication chip 23 are disposed on the circuit control carrier board 21, and the non-contact radio frequency antenna 22 is disposed in the circuit control carrier board 21. Accordingly, when carrying out transactions with the card body 1, the user may use the card body 1 to be close to a reading module, or use the card body 1 to insert into the reading module, so that the electronic control module 2 obtains the power provided by the reading module through the non-contact radio frequency antenna 22 in the case that the card body 1 is close to the reading module or the contact communication chip 23 in the case that the card body 1 is inserted into the reading module, and the electronic control module 2 is started by the power to make the electronic control module 2 exchange personal information and transaction data with the reading module for transactions by using the circuit control carrier board 21 to go with the non-contact radio frequency antenna 22, or exchange personal information and transaction data with the reading module for transactions by using the circuit control carrier board 21 to go with the contact communication chip 23, and the electronic control module 2 drives the light emitting module 3 to make the light emitting module 3 emit a light source and go with the shielding of the first shading part 13 and the second shading part 15, so that the light source may be assuredly guided by the light guide module 4 to the light-transparent frame part 11 by way of the light-transparent combination part 16, and the periphery of the card body 1 emits a displaying light source, thereby informing a consumer that the transaction is being processed, in addition to achieving the effect of the transaction prompt, it also has an aesthetic visual effect.

In one embodiment of the present disclosure, the first light-transparent panel 12 and the light guide module 4 respectively have the opening parts 120, 40 corresponding to the contact communication chip 23, so that the contact communication chip 23 is provided in the card body 1 in an exposed form, and thus the contact communication chip 23 obtains the power from the reading module in a contact manner, and exchanges personal information and transaction data for transactions.

In one embodiment of the present disclosure, the light emitting module 3 has one or more light emitter 31, the light guide module 4 has one or more perforations 41 for accommodating the light emitters 31, in a preferred embodiment of the present disclosure, the light emitting module 3 may have four light emitters 31 in matrix arrangement, and the light guide module 4 has four perforations 41, each the perforation 41 accommodates each the light emitter 31. Accordingly, the light emitter 31 may emit a light source, by the shielding of the first shading part 13 and the second shading part 15, the light source may be assuredly guided by the light guide module 4 to the light-transparent frame part 11 by way of the light-transparent combination part 16, and the periphery of the card body 1 emits a displaying light source, thereby informing a consumer that the transaction is being processed, in addition to achieving the effect of the transaction prompt, it also has an aesthetic visual effect.

In one embodiment of the present disclosure, each the light emitter 31 may be a LED, so that the light emitting module 3 has effects of low power consumption, small size and strong plasticity to meet the use of the card body 1.

Figure 4:
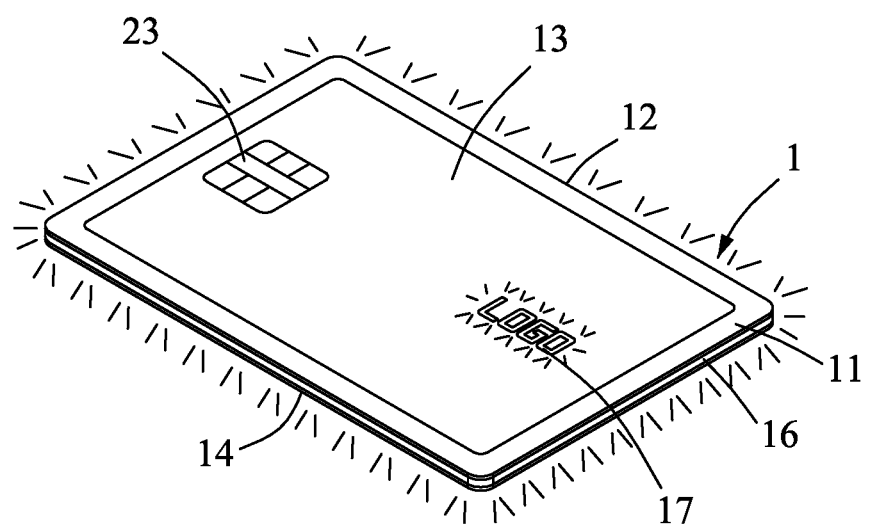
FIG. 4 is a schematic outside view of a second preferable embodiment of the present disclosure.
Figure 5:
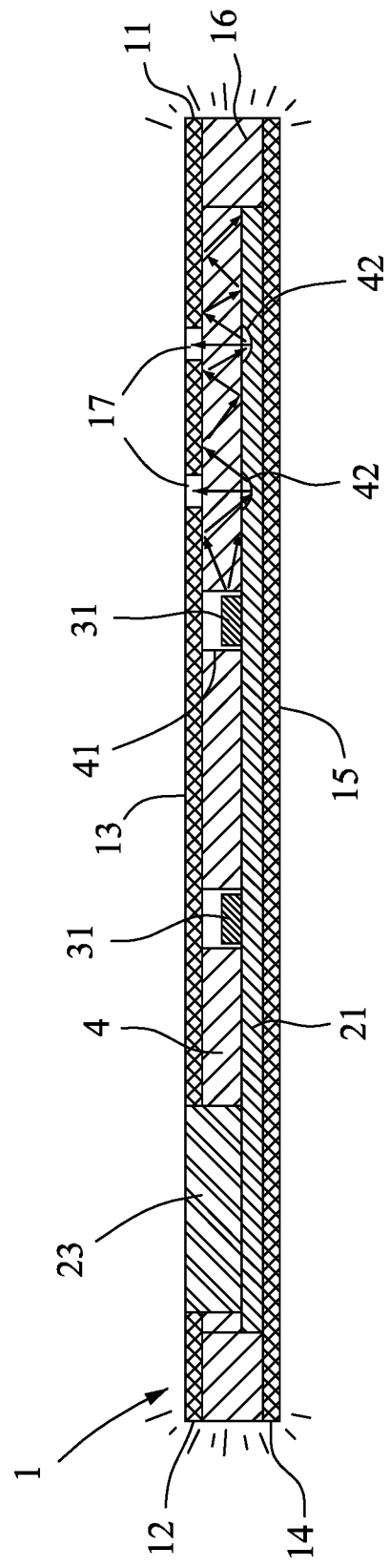
FIG. 5 is a schematic sectional view of the second preferable embodiment of the present disclosure.

Referring to FIGS. 4 and 5, as shown in the drawings, in one embodiment of the present disclosure, the card body 1 further comprises a surface light-transparent part 17, the light guide module 4 has at least one refractive part 42, the refractive part 42 corresponds to the surface light-transparent part 17, the light guide module 4 may go with the refraction part 42 to guide the light source of the light emitting module 3 to the light-transparent frame part 11 and the surface light-transparent part 17.

Based on the above embodiment, when carrying out transactions with the card body 1, the user may use the card body 1 to be close to a reading module, or use the card body 1 to insert into the reading module, so that the electronic control module 2 obtains the power provided by the reading module through the non-contact radio frequency antenna 22 in the case that the card body 1 is close to the reading module or the contact communication chip 23 in the case that the card body 1 is inserted into the reading module, and the electronic control module 2 is started by the power to make the electronic control module 2 exchange personal information and transaction data with the reading module for transactions by using the circuit control carrier board 21 to go with the non-contact radio frequency antenna 22, or exchange personal information and transaction data with the reading module for transactions by using the circuit control carrier board 21 to go with the contact communication chip 23, and the electronic control module 2 drives the light emitting module 3 to make each the light emitter 31 of the light emitting module 3 emit a light source and go with the shielding of the first shading part 13 and the second shading part 15, so that the light source may be assuredly guided by the light guide module 4 to the light-transparent frame part 11 by way of the light-transparent combination part 16, and to the surface light-transparent part 17 by way of the refraction part 42, and the periphery and surface of the card body 1 can emit displaying light sources, thereby informing a consumer that the transaction is being processed, in addition to achieving the effect of the transaction prompt, it also has an aesthetic visual effect.

While the present disclosure has been described by means of preferable embodiments, those skilled in the art should understand the above description is merely embodiments of the disclosure, and it should not be considered to limit the scope of the disclosure. It should be noted that all changes and substitutions which come within the meaning and range of equivalency of the embodiments are intended to be embraced in the scope of the disclosure. Therefore, the scope of the disclosure is defined by the claims.

What is claimed is:

1. A transaction card with a luminous display, comprising:
a card body, provided with a light-transparent frame part around;
an electronic control module, provided in the card body;
a light emitting module, provided in the card body and electrically connected to the electronic control module; and
a light guide module, provided in the card body and corresponds to the light emitting module, the light guide module guides a light source of the light emitting module to the light-transparent frame part of the card body;
wherein the card body comprises a first light-transparent panel, a first shading part, a second light-transparent panel and a second shading part, the first light-transparent panel is combined with the second light-transparent panel, the first shading part is disposed on the first light-transparent panel, the second shading part is disposed on the second light-transparent panel, and the electronic control module, the light emitting module and the light guide module are provided between the first light-transparent panel and the second light-transparent panel;

wherein the first shading part is smaller than the first light-transparent panel, the second shading part is smaller than the second light-transparent panel, so that the card body forms the light-transparent frame part around.

2. The transaction card with a luminous display according to claim 1, wherein the electronic control module includes a circuit control carrier board, a non-contact radio frequency antenna and a contact communication chip, the light emitting module and the contact communication chip are disposed on the circuit control carrier board, and the non-contact radio frequency antenna is disposed in the circuit control carrier board.

3. The transaction card with a luminous display according to claim 1, wherein the light emitting module has a light emitter, the light guide module has a perforation for accommodating the light emitter.

4. The transaction card with a luminous display according to claim 1, wherein the light emitting module has a plurality of light emitters, the light guide module has a plurality of perforations, each the perforation accommodates each the light emitter.

5. The transaction card with a luminous display according to claim 1, wherein the card body further comprises a surface light-transparent part, the light guide module has at least one refractive part, the refractive part corresponds to the surface light-transparent part, the light guide module goes with the refraction part to guide the light source of the light emitting module to the surface light-transparent part.

6. A transaction card with a luminous display, comprising:
a card body, provided with a light-transparent frame part around;
an electronic control module, provided in the card body;
a light emitting module, provided in the card body and electrically connected to the electronic control module; and
a light guide module, provided in the card body and corresponds to the light emitting module, the light guide module guides a light source of the light emitting module to the light-transparent frame part of the card body;
wherein the card body comprises a first light-transparent panel, a first shading part, a second light-transparent panel and a second shading part, the first light-transparent panel is combined with the second light-transparent panel, the first shading part is disposed on the first light-transparent panel, the second shading part is disposed on the second light-transparent panel, and the electronic control module, the light emitting module and the light guide module are provided between the first light-transparent panel and the second light-transparent panel;
wherein the light guide module is located between the first shading part and the second shading part, and the light guide module is a transparent PVC, PET, PC or PMMA material.

7. A transaction card with a luminous display, comprising:
a card body, provided with a light-transparent frame part around;
an electronic control module, provided in the card body;
a light emitting module, provided in the card body and electrically connected to the electronic control module; and
a light guide module, provided in the card body and corresponds to the light emitting module, the light guide module guides a light source of the light emitting module to the light-transparent frame part of the card body;
wherein the card body comprises a first light-transparent panel, a first shading part, a second light-transparent panel and a second shading part, the first light-transparent panel is combined with the second light-transparent panel, the first shading part is disposed on the first light-transparent panel, the second shading part is disposed on the second light-transparent panel, and the electronic control module, the light emitting module and the light guide module are provided between the first light-transparent panel and the second light-transparent panel;
wherein the first light-transparent panel and the second light-transparent panel are combined by a light-transparent combination part, and the light-transparent combination part corresponds to the light-transparent frame part and connects to a circumference of the light guide module.

* * * * *